June 26, 1928. 1,674,937
A. WIRTH
PRECISION BEAM BALANCE
Filed March 23, 1926  6 Sheets-Sheet 1
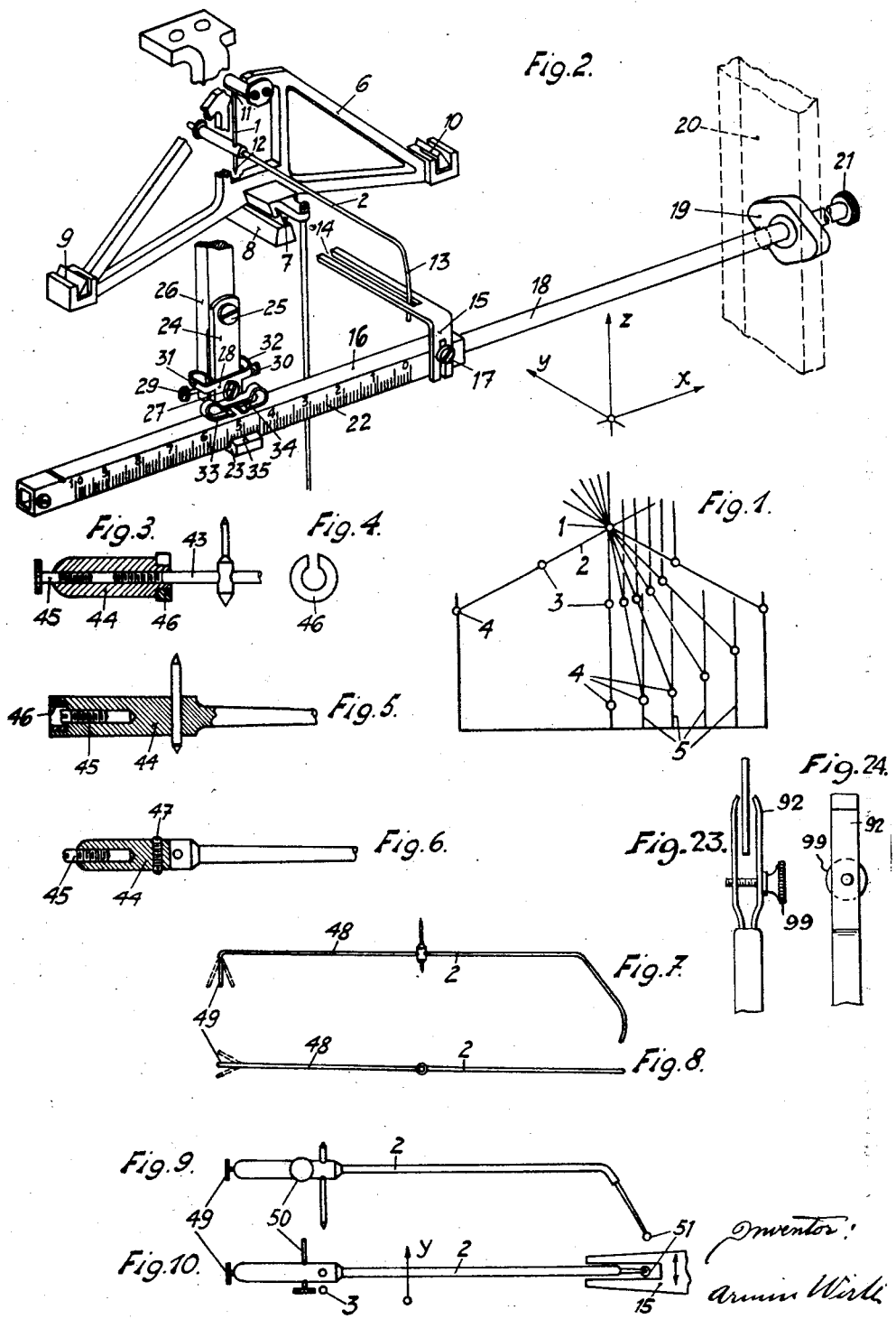

June 26, 1928.  A. WIRTH  1,674,937
PRECISION BEAM BALANCE
Filed March 23, 1926  6 Sheets-Sheet 2
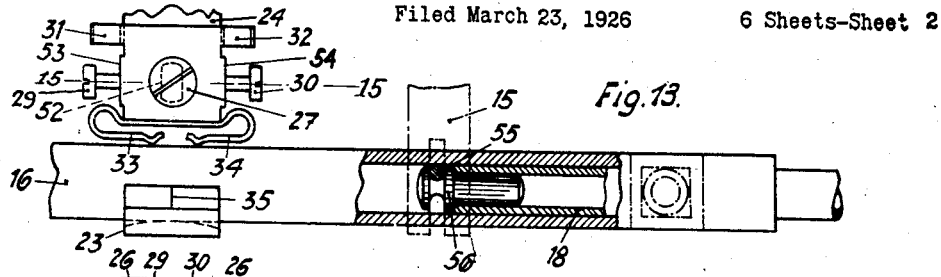
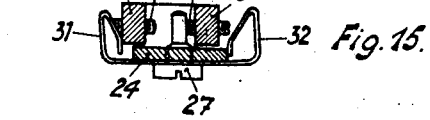
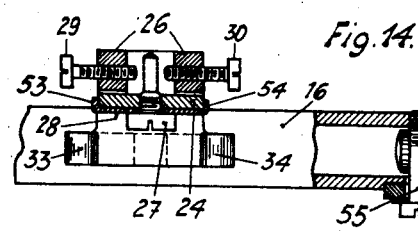
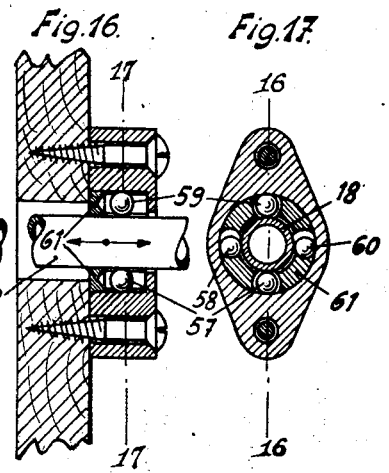
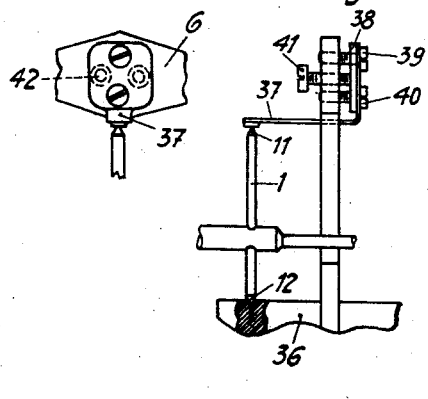
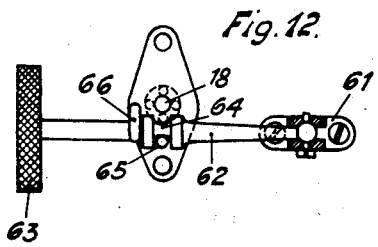
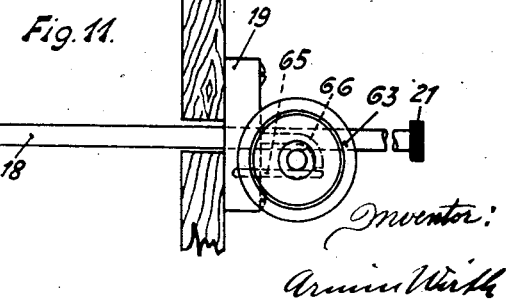

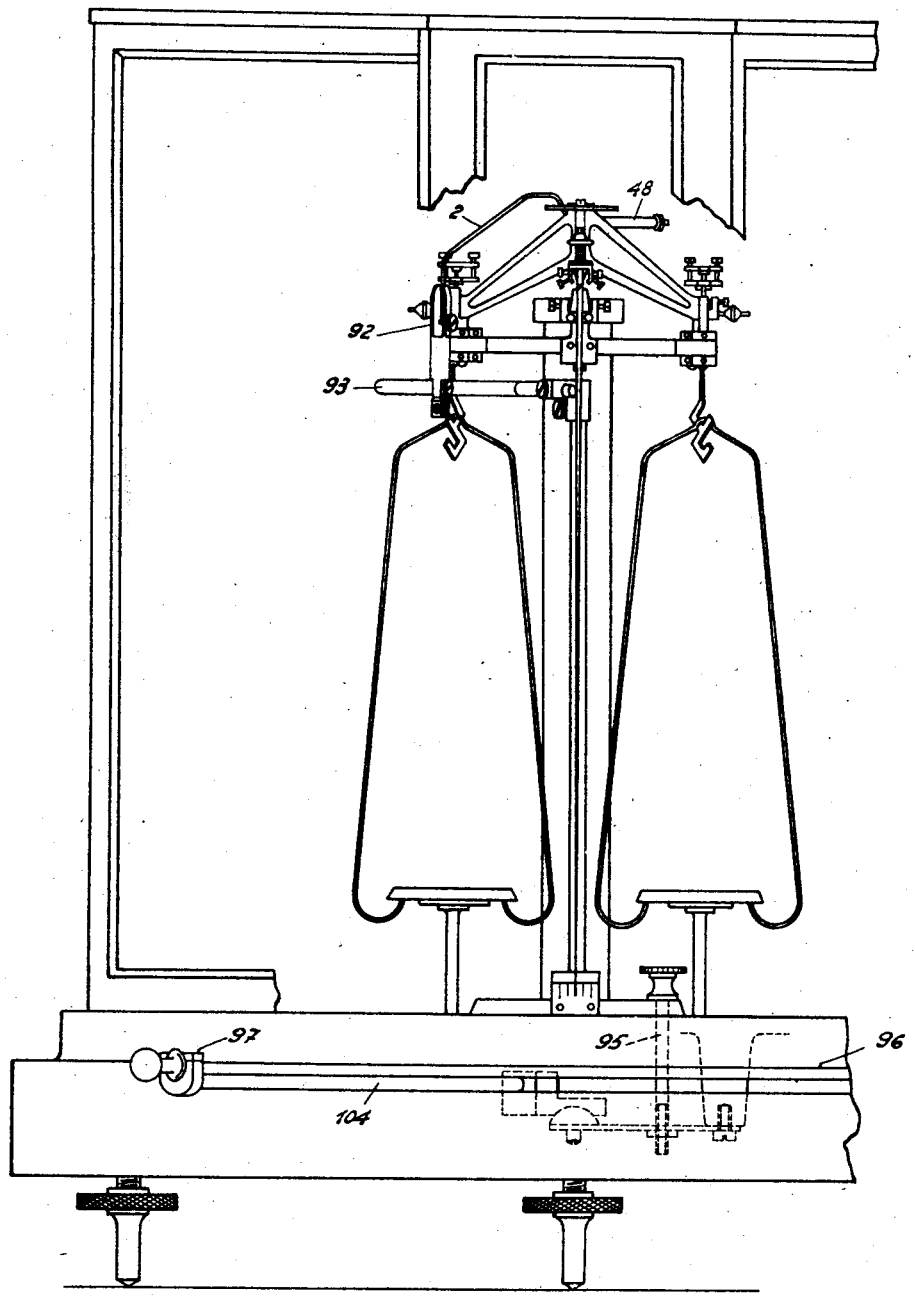

June 26, 1928.

A. WIRTH 1,674,937

PRECISION BEAM BALANCE

Filed March 23, 1926

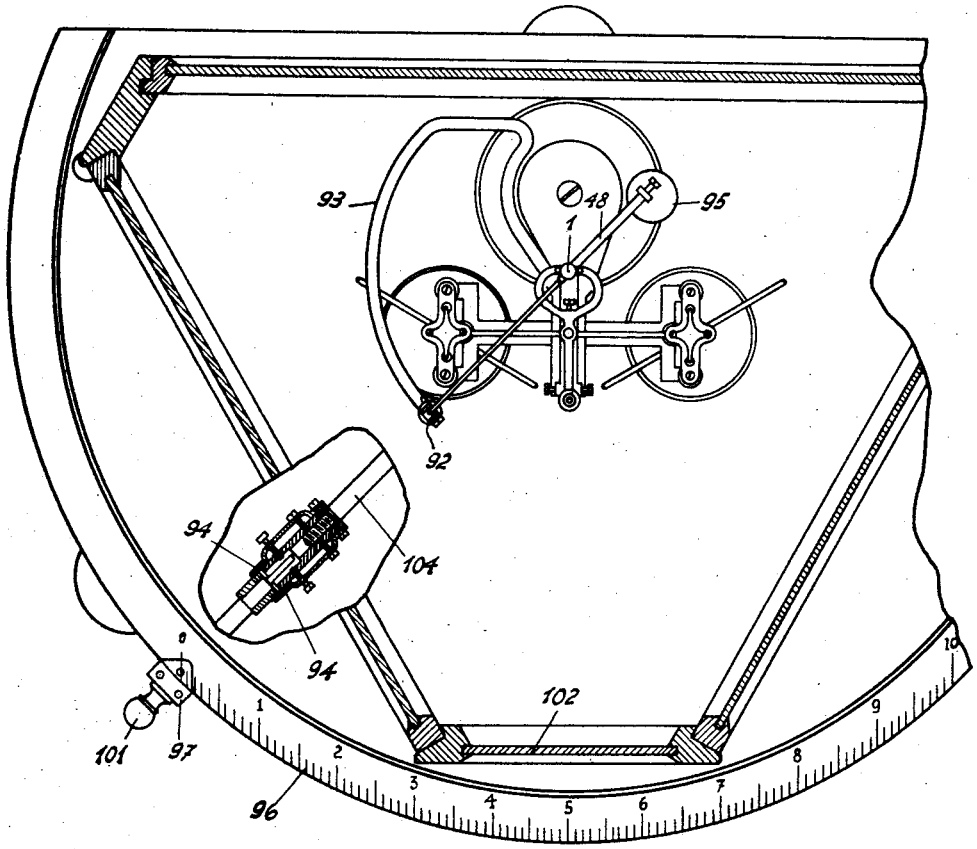

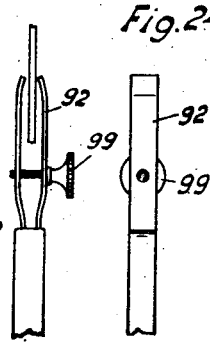

Patented June 26, 1928.

1,674,937

UNITED STATES PATENT OFFICE.

ARMIN WIRTH, OF ZURICH, SWITZERLAND, ASSIGNOR TO THE FIRM AUGUST SAUTER, WAAGENFABRIK, OF EBINGEN, WURTT, SWITZERLAND.

PRECISION BEAM BALANCE.

Application filed March 23, 1926. Serial No. 96,692.

The invention relates to new and improved precision beam balances such for instance as analytical balances.

It is a well known fact, that in beam balances of the type specified and now in common use, loose weights are used and that these riders have many drawbacks. The adjustment of the riders and their placing on the beam requires much time as an adjustment of a rider can only take place after the beam has come to rest. If the adjustment is not very carefully performed the riders fall from the beam and in endeavoring to bring them into the desired position they are easily deformed by the operator if he has not had very much experience. If riders have to be used of less than 0,01 grm. weight for instance the usual riders of 1 or 0,5 milligram in the so-called micro-analytical-balances the difficulties increase rapidly, hence only very expert operators may use such balances. Now some types of balances have been brought in the market for instance, the so-called "ultra-balances" using riders weighing 0,1 or even 0,05 milligrams. Such riders can only be handled by few persons having very long experience and by making use of the most delicate mechanical adjusting means magnifying glasses etc. and with a great loss of time.

The main object of the invention is to provide a beam balance of the type specified by means of which the weighing operation may be performed in less time and with greater possible accuracy than heretofore.

I attain this object by making use besides the loose weights of larger units and in place of the usual riders of an auxiliary weight or supplementary poise rotatably mounted on the beam of the balance about an axis standing vertical to and intersecting the horizontal knife-edge by which the beam of the balance is fulcrumed. This poise is set by means of an adjusting device from outside a casing in which the balance is placed, the position of the poise and therefore the weight to be ascertained may be read-off on a graduated bar. The poise leaves the beam free to rock, after each adjustment the poise does not in any position interfere with the oscillations of the beam. Other objects of the invention relate to the provision of minor parts and to details of construction, all of which will be more clearly set forth in the following specification. By the means cited I attain the following advantages:

1. The supplementary poise can be adjusted even if the beam is oscillating. As the beam does not have to be arrested by adjusting the poise no time is lost.

2. By the final stage of the weighing operation in the range of the supplementary poise (say 0,01 gr.) the adjustment of the poise by the operator may take place simultaneously with the watching of the oscillations of the beam until equilibrium is attained.

3. The new balance can be used by persons with little experience without liability of damage to the balance and the weights.

4. For experienced operators on the other hand the work is much less strenuous as the parts are so arranged he can not make any movement or adjustment with liability of damage to the balance, the beam having full play and swinging freely at any position of the poise.

5. The poise may be chosen and adjusted without difficulty.

6. By making use of special devices the weight of the load may be read-off up to thousand units, whereas in the balances known up to now, only hundred units may be read-off at the best.

In order that my invention may be clearly understood I have illustrated the same in the accompanying drawings, wherein Fig. 1 is a diagram illustrating the principle of the adjustment of the poise on its pivot by means of a slide moving in rectilinear direction;

Fig. 2 is a perspective view of the beam with the poise and with the adjusting means, Figs. 3 to 8 show in side view and in section several constructions of the supplementary poise and of the means to adjust the centre of gravity of the poise, Figs. 9 and 10 illustrate a poise in engagement with the means for adjusting it in side elevation and in a plan;

Figs. 11 and 12 are side elevation and face views of a device to adjust the turning poise, Figs. 13, 14 and 15 illustrate the means partly in section on line 15—15 of a device to bring the adjusting means automatically out of engagement with the turning poise.

Fig. 16 is a section on line 16—16 of Fig. 17 of a bearing of a sliding bar.

Fig. 17 is a section of same on line 17—17 of Fig. 16;

Fig. 18 is a side elevation of the bearing of the turning poise.

Fig. 19 is a partial front elevation of the same.

Fig. 20 is a front elevation of a microbalance, according to the invention;

Figure 21:
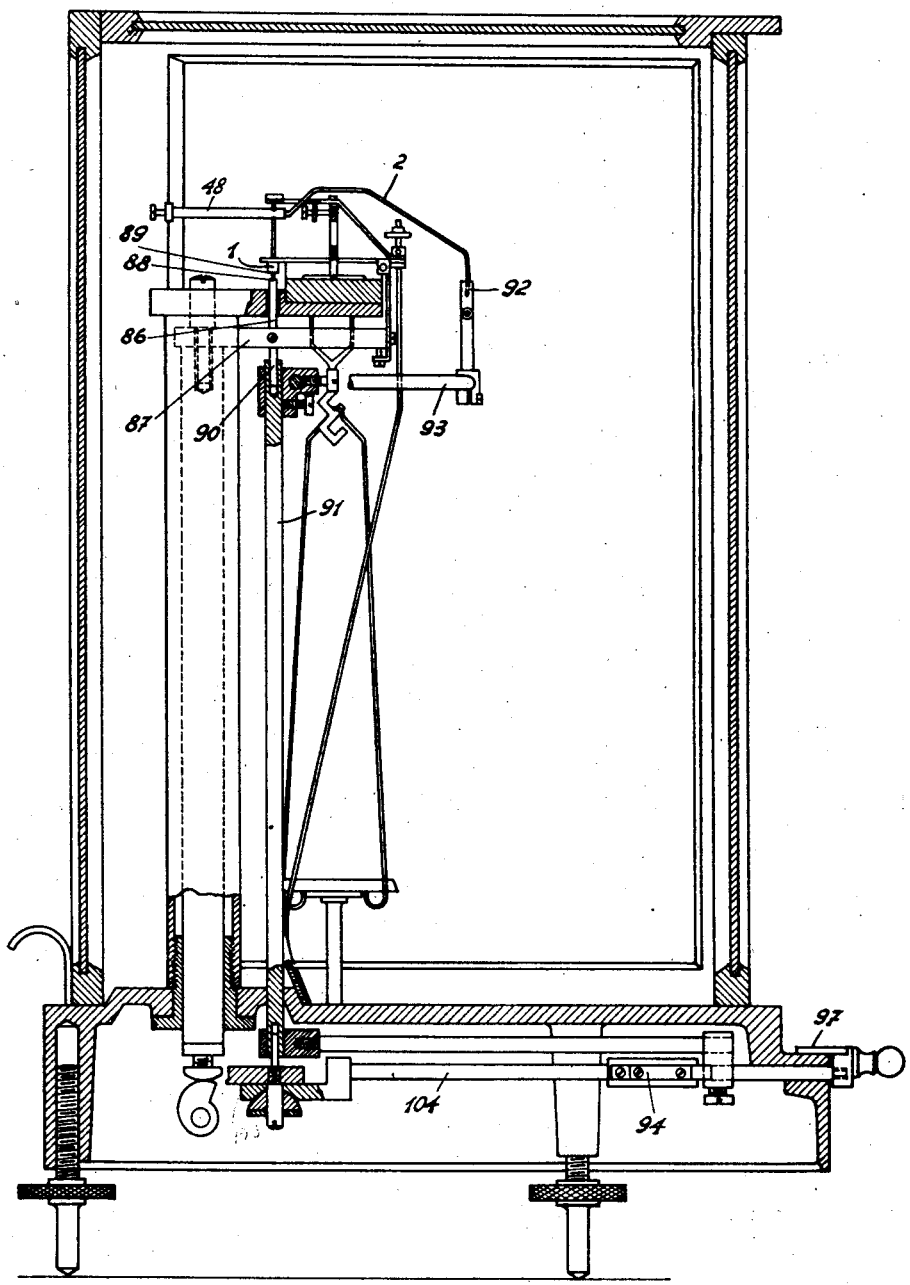
Fig. 21 is a side view thereof.

Fig. 22 a top view of same;

Fig. 23 shows the carrier for the poise in a side view;

Fig. 24 is a front view of the same.

The principle of the new balance is illustrated in Fig. 1. In this figure, 1 denotes the axis of rotation of the poise 2, 3 denotes the centre of gravity of the poise and 4 the point where the slide 5 moving said poise 2 acts, and 6 is the beam of the balance. It is apparent from this diagram that the distance of the centre of gravity 3 from the vertical centre plane through the fulcrum of the beam 6 and the leverage with which the poise 2 acts on the beam is proportional to the distance of the slide 5 (moving on a straight bar) from the said centre plane. By displacing the slide 5 on its guide bar the centre of gravity 3 of the poise 2 will be displaced in a certain fixed proportion thereto.

Fig. 2 shows how the analytical balance is constructed. The beam is supported with its knife-edge 7 by a bearing 8. The pillar supporting said bearing 8, and associated mechanism hung on the knife edges 9, 10 may be constructed in any well known manner, and as these features form no part of the invention, they are not shown in detail in the drawings. On the beam 6 a vertical shaft is journalled the ends 11, 12 thereof being pointed. On the shaft running at right angle thereto the poise 2 is fixed. The free end 13 of the poise 2 is bent downwards and engages a slot 14 of a bracket 15 adjustably fixed to a slide 16 by means of a set screw 17. The poise has some play in the slot; the point at which the poise 2 engages the bracket 15 and the knife edge on which the beam 6 rocks are in the same plane. The slide 16 is rigidly fixed to a rod 18 which is supported in a bearing 19 fixed to the wall 20 of a casing (a portion of which is shown in dotted lines in the drawings) in which the balance is housed and which rod may be moved in its axial direction by means of a knob 21. The slide 16 having a square cross-section is provided on one side with graduations 22, and is slidably mounted in a foot 23 of a lever 24 pivoted on a bolt 25 on a bracket, the latter being fastened to the top of the casing. A blade spring 28 is fixed to the lever 24 by means of a screw 27. The free end of screw 27 projects in a slot in the bracket 26 (Figs. 14, 15) between the ends of two set screws 29, 30 screwed into the sides of said bracket 26. The set screws 29, 30 with screw 27 limit the movement of the lever 24. The blade spring 28 is provided with two members 31, 32 engaging opposite sides of the bracket 26, the members tending to hold the lever 24 in its vertical position, and screw 27 in the middle between the screws 29, 30. The blade spring 28 is moreover provided with two lower springy members 33, 34 which press up on the upper side of slide 16. The pressure of said members 33, 34 on the slide 16 is small and may be regulated by adjusting the spring 28, which has an elongated screw hole 52, up or down on the lever 24 and fastening it by the screw 27 in the proper position. Two lugs 53, 54 bent off the body of spring 28 and embracing two opposite walls of lever 24 retain the spring 28 in its proper position. If slide 16 is moved in its axial direction, the lever 24 will be turned on its pivot 25 until screw 27 strikes against one of the two screws 29, 30, the lever 24 being in frictional engagement with the slide 16 through the medium of the members 33, 34 (Figs. 14, 15). One of the members 31 or 32 is strained. If the slide 16 moves further in the same direction it slides over the foot 23 of lever 24 and the poise 2 is turned with its shaft by means of bracket 15. As soon as the slide 16 comes to rest, the strained member 31 or 32 expands and turns lever 24 into its initial, or vertical position on the bracket 26. The lever 24 being moved in the manner described, is such that the free end 13 of the poise 2 is exactly in the middle of slot 14, the poise 2 being quite free and offers no frictional resistance, to the oscillations of beam 6. The foot 23 is provided with an index line 35 which facilitates the reading. The end portion 13 of the poise 2 forms an arc having its centre at the axis of rotation of beam 6, to obviate inaccuracies if the poise 2 is adjusted when the beam 6 is out of its equilibrium. The inaccuracy would however be very small, if the length of the beam is for instance about 150 millimeters and taking an angle of deviation of the beam 6 of 3° as a maximum, from the maximum deviation from a straight line would only amount to 0.08 to 0.1 millimeter even if the poise is turned for about 60° to 90° from its centre of initial position. The inaccuracy would only amount to $\frac{1}{10}$ of the last unity read-off. The inaccuracy might be still reduced if the slide 15 moves in a circular path as shown in Figs. 20, 21, 22, and may be wholly obviated if the end of the poise carries a ball as shown in Figs. 25, 26, 27.

In analytical balances of the usual dimensions a backlash of 0,2 mm. on each side of the piece 13 is quite sufficient. The inaccuracy which may happen at the worst is two-tenths of the smallest unity read-off, that play on the other hand will be sufficient to let the beam freely oscillate. If it is desired to guess the tenth of the smallest unit read it will be necessary to reduce the said backlash for one half or one third. If carefully handled the balance will even with this reduced play work with perfection. For analytical balance a poise weighing one hundredth of a gram in its extreme position will be best and each division on the graduated slide 16 corresponds to one tenth milligram. The manner in which the turning poise is mounted on the beam 6 is shown in Figs. 18 and 19. The shaft of the poise rests with point 12 in the block 36 supporting the knife edge of beam 6. The second point 11 engages a bearing of a blade spring 37 which spring is attached to a disk 38 adjustably held by means of four screws 39, 40, 41, 42. By means of these screws the spring 37 may be adjusted in the directions denoted by $x$ and $y$ (Fig. 2) on the beam 6. Such a bearing will be quite sufficient for ordinary analytical balances while jewel bearings would have to be used for the much more sensitive so called micro-balances.

Fig. 3 shows one form of construction of the means to adjust the centre of gravity of the poise 2. The poise 2 forms a two-armed lever, a sleeve 44 being screwed on one arm and in the sleeve 44 is a screw 45. By screwing sleeve 44 on the arm of the poise 2 an approximate adjustment is obtained, the exact adjusting being accomplished by means of the screw 45. An open ring 46 is rotatably mounted on the sleeve 44. By turning the ring 46 on the sleeve 44 the centre of gravity may be laid into a horizontal plane $x—y$ (Fig. 2) passing through the axis of the poise 2. This is a condition to obtain a true result. Instead of using a ring 46 the arm 43 may be bent in the proper direction.

Fig. 5 shows a modified construction, the sleeve 44 forming an arm of the poise being provided with an enlarged bore in which the ring 46 is housed. The ring 46 as well as screw 45 can only be turned by special tools and accidental displacements are obviated.

A further modification is shown in Fig. 6. In a cross-bore of sleeve 44 a screw 47 is arranged by means of which a displacement of the centre of gravity may be obtained.

Figs. 7 and 8 show a further modification adapted especially for the very sensitive micro-balances having very light beams 6. The arm 48 forms a counter-poise the end portion 49 being bent to bring the centre of gravity of the poise into the proper position.

Figs. 9 and 10 illustrate another form of construction with part of the slide 15 movable in the direction denoted by $y$ (Fig. 10). In this construction the centre of gravity 3 need not be situated in a plane passing through the axis of the poise 2, and the point of action of slide 15, but in a plane given by the lines $y—z$ (Fig. 2). The adjustment of the centre of gravity may be performed by turning screw 49 while the weight is adjusted by means of a screw 50. The poise 2 is provided with a small ball 51 at its forward end which ball projects in the slot of slide 15. If beam 6 rocks about its knife-edge 7, the ball 51 is moved in a circular path at each position of the poise 2. In any position of the poise 2, the beam 6, the ball 5 and the slide 15 are in correct engagement.

The means to move the slide 16 are shown in detail in Figs. 13 and 14. The slide 16 is hollow and has a square cross-section. Into the slide 16 projects the end of the round and hollow bar 18. A screw 55 crossing slide 16 passes through a circular groove of a head 56 fixed to the bar 18. The bar 18 turns freely in the slide 16 but the slide 16 follows any axial displacement of bar 18.

The bar 18 passes through a bearing 19 (Figs. 16, 17) and between four balls 57, 58, 59 and 60 rotatably arranged in a cage of said bearing 19, and having some play in a slot in the direction of the bar 18. If bar 18 is moved in axial direction, the balls roll in the direction of the movement until they abut on the wall of the slot, and if bar 18 is moved further the balls turn round their centres. If bar 18 is free the balls roll back with the bar 18 under the pressure of the expanding spring member 31, 33 or 32, 34. The bar 18 offers little frictional resistance, therefore the spring members 31, 32, 33, 34 are not strained and work smoothly. The adjusting device as described is very sensitive.

The poise 2 may be adjusted while the beam 6 is rocking. If the slide 16 is moved quickly, the oscillations of the beam are not interfered with. But if the slide 16 is brought to bear on the poise 2 without pushing the slide 16 further, a damping effect may be produced and by this means a steadying of the beam may be obtained without arresting it altogether, if owing to the great difference between load and weight (say 7 milligrams) the oscillations are great.

A device for fine adjustment is shown in Figs. 11 and 12, which is especially destined for micro-balances, with short beams (say 50 millimeters). The poise 2 will have to be built in proportion thereto, and adjustments of the slide 16 of about 0,5 millimeter will be frequent. Such adjustments are not easy to carry out by hand and to assist the operators the following device may be added.

A shaft 62 is rotatably mounted in a support 61 of bearing 19. Shaft 62 is provided with a circular groove 64 the breadth of which is somewhat less than the diameter of the rod 18. The shaft 62 which is provided with a knob 63, rests on a pin 65, within a hooked guide 66. To shift the rod 18 the shaft 62 is lifted until it bears on rod 18 and by turning knob 65 the rod 18 is moved by friction. As soon as knob 65 is released the shaft 62 drops down and is out of engagement with rod 18. By this device a shifting of slide 16 for one tenth of a millimeter may be performed, and the index line 35 may be replaced by a nonius. A very high precision may be attained and the readings are comparatively easy.

The new micro-balance is shown in the Figs. 20, 21 and 22. The slide 92 to set the poise 2 is slidably arranged in a circular guide, the centre of which being in the axis of rotation of the poise 2. The shaft 1 carrying the poise 2 is supported by a bolt 86 fixed to a support 87 the lower end 90 of which projects into a bore of the vertical shaft 91. In the upper end of the bolt 86 is a cavity 88, into which the point 89 of shaft 1 projects. By means of shaft 91 the poise 2 may be set to the desired position. To shaft 91 is rigidly attached an arm 93 and on the arm 93, the fork 92 is arranged by means of which the poise 2 is turned round its axis. The fork 92 (Figs. 23, 24) consists of two springy prongs the position of which may be varied by means of a set screw 99. To the lower end of shaft 91 an arm 100 is fixed, same being provided at its end with a handle 101 adapted to be moved from outside the casing 102. To handle 101 a plate 97 of transparent material is fixed which plays over a graduation 96 of the base of the balance. The shaft 91 is pivoted on a pin 103 on which an arm 104 is rotatably mounted, but braked by friction. The free end of arm 104 is provided with two springs 94 engaging a downwardly projecting portion of shaft 100 from both sides. If arm 100 after having been moved by the handle 101 is released one or the other of the springs 94 will slightly turn back the arm 100 and will free the poise 2 from contact with the fork prongs 92.

The part 87 forms part of the arresting device of the balance and as such device forms no part of the present invention, it has not been described. The position of the poise may be indicated by its angle of deviation from a certain plane, or by measuring the tangent of said angle of deviation but these methods have the drawback that the graduations are not easy to make and they are advantageous only for certain relative positions to the axis of rotation.

I wish it clearly understood that I do not confine the invention to the particular form and construction of the balance and the parts thereof as described, as various changes may be made without departing from the spirit of the invention.

What I claim by U. S. Letters Patent is:—

1. A precision beam balance comprising in combination, a support, a beam fulcrumed by a knife edge on said support, a pan to receive the load, a second pan to receive the loose weights, and a poise rotatably mounted on said beam the axis of rotation of said poise being parallel to said knife edge.

2. A precision beam balance comprising in combination, a support, a beam fulcrumed by a knife edge on said support, a pan to receive the load, a second pan to receive loose weights, and a poise rotatably mounted on said beam, the axis of rotation of said poise being parallel to said knife edge, means to turn the poise about its axis.

3. A precision beam balance comprising in combination a support, a beam fulcrumed by a knife edge on said support, a pan to receive the load, a second pan to receive loose weights, a poise rotatably mounted on said beam, the axis of rotation of said poise being parallel to said knife edge, and means to turn the poise about its axis said means acting on said poise in a plane passing through the knife edge on which the beam rocks.

4. A precision beam balance comprising in combination a support, a beam fulcrumed by a knife edge on said support, a pan to receive the load, a second pan to receive loose weights, a poise rotatably mounted on said beam, the axis of rotation of said poise being parallel to said knife edge, means to turn the poise about its axis, said means comprising a slide, a rectilinear guide for said slide running parallel to the beam, and a slot formed in said slide adapted to receive the end of the poise, the slot being in a common plane with the knife edge on which the beam rocks.

5. A precision beam balance comprising in combination a support, a beam fulcrumed by a knife edge on said support, a pan to receive the load, a second pan to receive the loose weights, a poise rotatably mounted on said beam the axis of rotation of said poise being parallel to said knife edge, means to turn the poise about its axis, said means comprising a slide, a rectilinear guide for said slide running parallel to the beam, a slot in said slide adapted to receive the end of the poise, the slot being in a common plane with the knife edge on which the beam rocks, and means to automatically disengage the poise from the slide and means to adjust the centre of gravity of said poise.

In witness whereof I affix my signature.

ARMIN WIRTH.